United States Patent Office 3,494,737
Patented Feb. 10, 1970

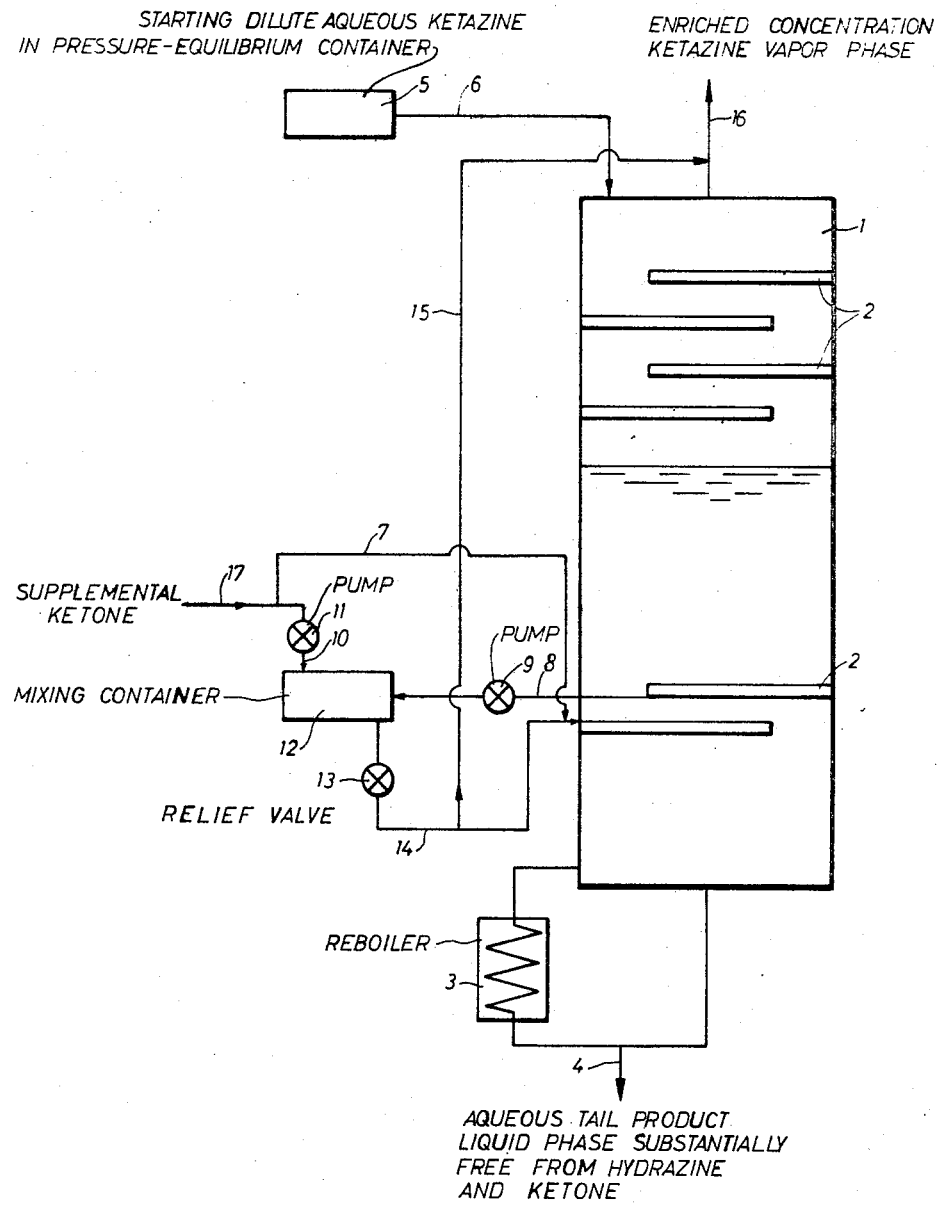

3,494,737
PROCESS FOR THE PREPARATION OF HYDRAZINE BY TRAY COLUMN FRACTIONATION
Rudolf Mundil, Leverkusen, Germany, assignor to Farbenfabriken Bayer Aktiengesellschaft, Leverkusen, Germany, a corporation of Germany
Filed Dec. 12, 1967, Ser. No. 690,017
Claims priority, application Germany, Dec. 17, 1966, F 50,989
Int. Cl. C01g 21/16; B01d 3/34
U.S. Cl. 23—190          5 Claims

ABSTRACT OF THE DISCLOSURE

Recovery of hydrazine from aqueous ketazine solution by separation of the more readily volatile components by distillation, e.g. at about normal pressure, in which the starting solution is fractionated in a tray column, e.g. having an upper vapor phase part and a lower liquid phase part under equilibrium conditions favoring ketazine rather than aqueous hydrazine hydrate and ketone, whereby to increase the concentration of the hydrazine content in the distillate without reducing the hydrazine yield, and permit subsequent hydrolysis of condensed distillate to eliminate the corresponding ketone for isolation of the desired hydrazine.

---

This invention relates to a process for the preparation of hydrazine and is particularly concerned with a process for the preparation of hydrazine from aqueous ketazine solutions by separating the more readily volatile component.

It has been known for some time that, following the addition of acetone to aqueous solutions of hydrazine hydrate, the hydrazine is enriched in the gas phase upon distillation. It has also been possible to apply this process on an industrial scale providing special measures are taken. In this connection, it has been proposed to contact the hydrazine hydrate in the form of its dilute aqueous solution with acetone in a residence vessel in which the equilibrium to dimethyl ketazine can be adjusted. An excess of acetone is used to promote ketazine formation. The reaction mixture is then fed to the head of a column and the lowest boiling components, i.e. acetone and an indeterminate compound containing large quantities of hydrazine, are removed from the head. A compound deprived of acetone and hydrazine hydrate leaves the column at its lower end, being collected and recontacted with an excess of acetone in a second residence vessel. Following readjustment of the equilibrium, the latter reaction mixture is fed to the head of a second column. The liquid vapours escaping at the head of the second column are guided upwards through the entire first part of the first column, combining with the vapours from the first part of the first column at the head. The same cycle of equilibrium adjustment followed by separation of the readily volatile components in a column is repeated until an almost hydrazine-free solution runs off from the bottom of the last column. It is clear that an apparatus for this kind of recovering takes up considerable space and is extremely complicated to operate. In addition, the tail products from each of the columns have to be cooled down very appreciably either wholly or at least in part, because, otherwise, the addition of acetone would promote a sudden build-up of pressure in the residence vessels due to the low boiling point of acetone. This pressure surge would be propagated along the columns, damaging the product input and output which are under the hydrostatic pressure prevailing at the inlet. It would also detrimentally affect the heat balance of the process. If, in contrast, the acetone is directly introduced into each column with a view to obviating these difficulties, the exchange between the acetone vapour immediately formed and the liquid trickling down the column is so weak that it is not possible in this way to increase the hydrazine concentration in the total vapour yield removed at the head of the column. This is not surprising because it is known that aqueous ketazine solutions can be deprived of hydrazine by fractionation at normal pressure in the head of a column providing the column is operated under reflux (see U.S. Patent No. 3,028,316). However, these very conditions prevail in cases where the acetone is fed in beneath the head of the column.

It is also known from copending U.S. patent application Ser. No. 689,756, filed simultaneously herewith that other ketazines can be used to produce this increase in the hydrazine hydrate concentration than dimethyl ketazine. For example, replacement of the acetone with methylethylketone results in an even greater increase in the hydrazine concentration in the gas phase, accompanied by the formation of diethyl ketazine. The rest of the process is then completed as described with reference to acetone.

A process for recovering hydrazine from aqueous ketazine solutions by separating the more readily volatile components has now been found in which the aqueous ketazine solutions are subjected to fractionation in a tray column, the hydrazine being isolated from the ketazine solutions enriched by condensation from the vapour phas following a hydrolysis stage in which the ketone is eliminated.

It has now been found in accordance with the present invention that the hydrazine can be economically enriched by the adjustment of an equilibrium between aqueous hydrazine hydrate solution and ketone if separation is carried out in a tray or plate column. Accordingly, the apparatus for enriching hydrazine can be reduced to the form of a conventional distillation plant. The tray column used to separate the lower boiling fractions provides a substantial increase in the residence time of the liquid before it is removed from the lower end of the column by virtue of the large liquid capacity of the column compared with that of a packed column or a sieve-tray column, thus dispensing with the need for additional adjustments of equilibrium (the upper vapour phase part of the solitary tray column used and the lower liquid phase part thereof being in open flow communication with each other). This observation was surprising because it had been assumed that a long residence time of the ketazine in that part of the column through which vapors flow would promote an excessive reverse hydrolysis of the ketazine into water, ketone and hydrazine hydrate (see said U.S. Patent No. 3,028,316).

Accordingly, the instant process essentially comprises completing the recovery cycle in a column with a large liquid capacity. If the quantity of residual hydrazine running downwards into the bottom end of the column has to be reduced to the lowest possible level, for example, in order to keep the bottom end effluent free of toxic substances, liquid ketone may again be fed into one of the trays in the lower part of the column. Since most of the ketazine is generally removed at the head of the column, even without this measure, with the result that only very small amounts of hydrazine are left at the lower end of the column, the subsequent addition of ketone to this lower part of the column represents a considerable excess in relation to the hydrazine still present, leading to further deprivation of the residual hydrazine content thereat. The activity of this subsequently added ketone can be increased by incorporating a second pressure residence stage. For this purpose, the overflow from one tray of the column in the lower third thereof is removed and, after passing through a pressure-increasing pump, is fed into a residence vessel under pressure into which ketone is simultaneously introduced. Depending on the ketone content, an excess pressure is developed which may be further increased to a desirable or more favourable optimum level by the additional supply of heat. After passing through this pressurized residence vessel, and then being depressurized, the additional vapour liberated by flash evaporation is directly combined with the vapour escaping from the head of the column in order to relieve the column, whilst the liquid is fed back to the tray situated beneath the tray from which the overflow had been removed.

The above-described process may of course be carried out with particular advantage in combination with a ketazine synthesis, in which a ketazine solution already suitable for delivery to the tray column used for enriching the hydrazine is available as a reaction product from the reaction of ketone with aqueous ammonia and bleaching liquor following separation of the excess ammonia as disclosed in U.S. Patents 2,993,758 and 3,077,383.

An apparatus for carrying out the process according to the invention is diagrammatically illustrated in the accompanying drawing.

A tray column 1 with trays 2 is associated with a circulation evaporator or reboiler 3 having an outlet 4 for the hydrazine- and ketone-free tail product, the ketazine solution being supplied to the column 1 from a pressure-equilibrium container or pressure residence vessel 5 by way of a pipe 6, whereby an upper vapour phase part and a lower liquid phase part in open flow communication with each other are formed in the solitary column. More ketone can be introduced through pipe 17 and thence pipe 7. Liquid can be removed from the lower third of the column 1 through a pipe 8, being delivered to a mixing container or pressure residence vessel 12 by way of a pressurizing pump 9, while ketone may be supplied thereto via pipes 17 and 10 and pressurizing pump 11. After it has been depressurized through a valve 13, the liquid phase is returned to the column 1 through a pipe 14, whilst the vapour liberated by depressurisation is delivered through a pipe 15 to the head of the column where it is combined with the vapour drawn off through a pipe 16.

Embodiments of the invention are described in the following examples.

EXAMPLE 1

A bubble tray distillation column (see the drawing) with 40 trays was preceded by a pressure vessel 5 through which the ketazine solution to be enriched with hydrazine, containing an excess of ketone (1.9% hydrazine hydrate, 11.4% ketone), had to pass. The temperature of the solution introduced was raised to 102° C. by heating with a steam coil arranged in the residence vessel, a pressure of 1.3 atm. being maintained. Whilst fresh ketazine solution flowed continuously into the vessel, a sufficient amount of ketazine solution—5000 kg./h. of a solution with 95 kg. of hydrazine hydrate, 770 kg. of acetone and 4135 kg. of water—was continuously run into the tray column through a level-controlled valve for the level in the container to be maintained. The capacity of the residence vessel was such that the liquid passing through it had an average residence time of 22 minutes. To obtain a favourable resident time spectrum, the residence vessel was designed in such a way that it was in the form of two long cylindrical tubes arranged one behind the other. The liquid flowed out of the residence vessel into the column operated at normal pressure. The inflowing product was delivered to the head of the column. A liquid rate with a residual hydrazine hydrate content of 0.21% was continuously run off from the lower end of the column (7.5 percent of input), that is 3375 kg./h. of water with 7.1 kg. of hydrazine hydrate and 3.0 kg. of acetone, whereas at the head of the column 760 kg./h. of water with 87.9 kg. of hydrazine hydrate and 667 kg. of acetone in the form of a ketazine enriched solution were taken off.

EXAMPLE 2

The apparatus was operated in the same way, except that more ketone—77 kg./h. of acetone—was introduced via line 7 into the column at the fourteenth tray, counting from the bottom, in a quantity of 10% of the ketone present in the starting quantity. With otherwise the same arrangement, the tail product only contained 0.08% of hydrazine hydrate of 3.0% of the input, 3375 kg./h. of water with 2.85 kg. of hydrazine hydrate and 5.0 kg. of acetone are removed from sump and 760 kg./h. of water with 87.9 kg. of hydrazine hydrate and 742 kg./h. of acetone from the head, the hydrazine being in the form of the ketazine.

EXAMPLE 3

The apparatus was operated in the same way as for Examples 1 and 2. The liquid in the column—3445 kg./h. of water with 10 kg. of hydrazine hydrate and 9 kg. of acetone—was removed via line 8 therefrom at the fifteenth tray, counting from the bottom, and pumped by means of a pressure-increasing pump into a pressure residence vessel 12 into which ketone 77 kg./h. was simultaneously introduced in a quantity of 10% of the ketone present in the starting solution. The level in this vessel was adjusted by way of a level-controlled valve, and the liquid in the course of being relieved of pressure upon leaving the vessel was divided into a vapour component liberated during depressurisation which was passed to the head of the column—6 kg./h. of hydrazine hydrate, 40 kg./h. of water and 60 kg./h. of acetone—whilst the residual liquid 3405 kg./h. of water with 4 kg. of hydrazine hydrate and 26 kg. of acetone was delivered as return input to the 14th tray from the bottom via line 14. This avoided an excessive vapour pressure in the column whilst at the same time the hydrazine content of the return input was further decreased. With a sufficiently large column, the vapour liberated during depressurisation may even be supplied to the gas zone by way of the tray 14. In either case, the tail product—3375 kg./h. of water with 0.95 kg. of hydrazine hydrate and 5.0 kg. of acetone—contains only 0.028% of hydrazine hydrate or 1% of the input, whereas an enriched ketazine solution with 94.05 kg./h. of hydrazine calculated as hydrate and 742 kg./h. of acetone were removed at the head of the column.

Work up of the enriched concentration ketazine distillate in each of the examples (wherein acetone and dimethyl ketazine are the corresponding ketone and ketazine used) may be carried out by sulfuric acid hydrolysis to form dihydrazine monosulfate followed by thin film evaporation to isolate the hydrazine hydrate as distillate as disclosed in copending U.S. patent application Ser. No. 689,768, filed simultaneously herewith.

Otherwise the resulting distillate may be worked up after removal of the excess ketone by a distillation under super atmospheric pressure for hydrolyzing the ketazine into hydrazine hydrate and ketone according to the process of U.S. Patent 3,189,411.

The ketazines contemplated herein include dimethyl ketazine, diethyl ketazine, methylethyl ketazine, etc. and the corresponding ketones dimethyl ketone, diethyl ketone, methylethyl ketone, etc. i.e. di(lower alkyl)ketazines and ketones.

The starting solutions are obtained either by adding a ketone to the resulting solution of the so called Raschig- or urea-process or by using directly the resulting solution of e.g. the processes as described by U.S. Patents 2,993,758 or 3,077,383 or German Patent 1,019,647 or corresponding processes, wherein the hydrazine formation is performed in the presence of the ketone thereby obtaining a ketazine. From the reaction solution of the aforesaid processes the excess ammonia is removed and the ammonia free solution is then enriched according to the process of the present invention. Before the distillation the ketone hydrazine hydrate ratio is adjusted if necessary to a value of between 2.5 and 15 mols of ketone per mol of hydrazine hydrate, whereby hydrazine hydrate concentration of about 0.1 to 8 weight percent are used which concentrations result from the aforementioned processes. Before starting the enrichment distillation the solutions should be stored for a sufficient time to achieve equilibrium between the hydrazine and the ketone. This equilibrium—ketazine formation—is usually established in about 10 minutes after mixing the components. The distillation is carried out at temperatures of about 80 and 130° C.

The ketone additionally fed into the column either alone or in admixture with withdrawn ketazine can be fed into any tray of the column except the uppermost, a tray in the lower third of the column is however to be preferred. The additional ketone is added in an amount corresponding to the 0.01 to 0.5 fold of the ketone quantity in the starting solution.

What is claimed is:

1. In the process for the recovery of hydrazine hydrate from a dilute aqueous ketazine solution by separation of the more readily volatile liquid components by distillation with recovery and condensation liquefication of the gas phase distillate to form an enriched concentration aqueous ketazine solution followed by hydrolysis thereof to eliminate the corresponding ketone of the ketazine and permit isolation of the resultant hydrazine as hydrazine hydrate, the improvement for increasing the concentration of the hydrazine content in the distillate which comprises carrying out the distillation at about normal pressure by fractionation in a solitary tray column containing an upper vapor phase part and a lower liquid phase part in open flow communication with each other in the presence of sufficient excess ketone corresponding to the starting ketazine to provide equilibrium conditions favoring ketazine rather than reverse hydrolysis to hydrazine hydrate and ketone.

2. Improvement according to claim 1 wherein the starting aqueous ketazine solution is fed to the top of the column at a temperature slightly above about 100° C. and a pressure slightly above normal pressure and wherein the tray column fractionation is carried out at about normal pressure.

3. Improvement according to claim 1 wherein fresh ketone corresponding to that of the ketazine is fed in liquid form to a tray of the column in the lower liquid phase part in a quantity between about 1–50% by weight of the quantity of ketone present in the starting ketazine solution.

4. Improvement according to claim 1 wherein the liquid phase in the lower part of the column is removed from a tray in the lower third portion of the column and mixed with fresh ketone corresponding to that of the ketazine without intermediate cooling and under autogenous pressure in a confined residence zone, in a quantity of fresh ketone between about 1–20% by weight of the quantity of ketone present in the starting ketazine solution, and after being maintained for an average residence time of at least 10 minutes to achieve equilibrium of the resulting liquid mixture, such liquid mixture is returned to the column into a tray situated beneath that from which such liquid phase had been removed.

5. Improvement according to claim 4 wherein prior to return of such liquid mixture to the column, the liquid mixture is relieved of attendant autogenous pressure and the vapor accumulating during depressurization is fed to the head of the column.

References Cited
UNITED STATES PATENTS

| | | | |
|---|---|---|---|
| 3,028,316 | 4/1962 | Rahlfs et al. | 23—190 |
| 3,028,219 | 4/1962 | Rahlfs et al. | 23—190 |
| 3,010,790 | 11/1961 | Rahlfs et al. | 23—190 |

OSCAR R. VERTIZ, Primary Examiner

H. S. MILLER, Assistant Examiner

U.S. Cl. X.R.

203—14, 62